United States Patent
Schreder et al.

(10) Patent No.: US 7,341,965 B2
(45) Date of Patent: *Mar. 11, 2008

(54) BISMUTH OXIDE GLASSES CONTAINING GERMANIUM OXIDE

(75) Inventors: Bianca Schreder, Frankfurt (DE); Ruediger Sprengard, Mainz (DE); Ulrich Peuchert, Bodenheim (DE); Martin Letz, Klein-Winternheim (DE); Joseph S. Hayden, Clarks Simmut, PA (US); Sally Pucilowski, Luzerne, PA (US)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/489,021

(22) PCT Filed: Sep. 7, 2002

(86) PCT No.: PCT/EP02/10059

§ 371 (c)(1),
(2), (4) Date: Mar. 8, 2004

(87) PCT Pub. No.: WO03/022766

PCT Pub. Date: Mar. 20, 2003

(65) Prior Publication Data

US 2004/0254057 A1 Dec. 16, 2004

(30) Foreign Application Priority Data

| Sep. 10, 2001 | (DE) | ................................ 101 44 474 |
| Sep. 10, 2001 | (DE) | ................................ 101 44 475 |
| Feb. 22, 2002 | (DE) | ................................ 102 07 583 |
| Mar. 13, 2002 | (DE) | ................................ 102 11 247 |

(51) Int. Cl.
| C03C 13/04 | (2006.01) |
| C03C 3/064 | (2006.01) |
| C03C 3/066 | (2006.01) |
| C03C 3/068 | (2006.01) |
| C03C 3/095 | (2006.01) |
| C03C 3/091 | (2006.01) |

(52) U.S. Cl. ............................ 501/37; 501/64; 501/66; 501/67; 501/77; 501/78; 501/79; 385/142

(58) Field of Classification Search .................. 501/37, 501/42, 43, 49–52, 66, 57, 77, 64, 78, 79, 501/67; 385/123, 142
See application file for complete search history.

(56) References Cited

U.S. PATENT DOCUMENTS

| 3,723,141 A | 3/1973 | Dumbaugh |
| 3,947,089 A | 3/1976 | Rapp |
| 5,093,288 A | 3/1992 | Aitken et al. |
| 5,114,884 A * | 5/1992 | Lapp et al. .................... 501/41 |
| 5,168,079 A | 12/1992 | Aitken |
| 5,274,728 A | 12/1993 | Tran |
| 5,283,211 A | 2/1994 | Aitken et al. |
| 6,599,852 B2 * | 7/2003 | Kondo et al. ................. 501/42 |
| 6,599,863 B1 | 7/2003 | Palmer et al. |
| 6,620,748 B1 | 9/2003 | Sugimoto et al. |
| 6,653,251 B2 | 11/2003 | Sugimoto et al. |
| 2001/0044369 A1 * | 11/2001 | Sugimoto et al. .............. 501/50 |
| 2002/0041750 A1 * | 4/2002 | Chacon et al. .............. 385/141 |
| 2003/0064878 A1 | 4/2003 | Sugimoto et al. |
| 2005/0037913 A1 * | 2/2005 | Peuchert et al. .............. 501/78 |
| 2006/0063660 A1 * | 3/2006 | Screder et al. ................ 501/42 |

FOREIGN PATENT DOCUMENTS

| EP | 0 487 863 A | 6/1992 |
| EP | 1 254 869 A1 | 11/2002 |
| JP | 2001-213635 | 8/2001 |
| WO | 00 23392 | 4/2000 |
| WO | 01 55041 A | 8/2001 |

OTHER PUBLICATIONS

Patent Abstracts of Japan 011236245 , Aug. 31, 1999.
Patent Abstracts of Japan JP 2001-213635.

* cited by examiner

*Primary Examiner*—Karl E. Group
(74) *Attorney, Agent, or Firm*—Michael J. Striker (57) ABSTRACT

The invention relates to bismuth oxide glass, containing germanium oxide, a method for the production thereof, the use thereof and a glass fiber consisting of said inventive glass.

8 Claims, 5 Drawing Sheets

BISMUTH OXIDE GLASSES CONTAINING GERMANIUM OXIDE

The present invention relates to a glass which contains bismuth oxide and also contains germanium oxide, to a process for producing a glass of this type, to the use of a glass of this type and to a glass fiber which comprises the glass according to the invention.

Optical amplifier units are one of the key components of modern optical communication technology, in particular WDM technology (WDM="Wavelength Division Multiplexing"). Hitherto, the prior art has primarily used quartz glasses doped with optically active ions as core glass for optical amplifiers. Er-doped amplifiers based on $SiO_2$ allow simultaneous amplification of a plurality of closely adjacent channels differentiated by wavelength in the region around 1.5 μm. However, on account of the fact that the $Er^{3+}$ in $SiO_2$ glasses has only a narrow emission band, they are not suitable for the increasing demand for transmission power.

Accordingly, there is an increase in demand for glasses from which rare earth ions emit over a significantly broader band by comparison with the emission from $SiO_2$ glasses. In this context, glasses with heavy elements, in particular heavy metal oxide glasses or glasses containing heavy metal oxides (HMO glasses), are favored in this context. On account of their weak interatomic bonds, these heavy metal oxide glasses have high interatomic electric fields and therefore, on account of greater Stark splitting of unexcited state and excited states, lead to broader emission from the rare earth ions. Examples of glasses of this type are glasses based on tellurium oxide, bismuth oxide and antimony oxide.

Heavy metal oxide glasses of this type, however, have a number of drawbacks, compared to $SiO_2$ glasses, which have not yet been overcome by the prior art.

By their very nature, glasses of this type have weak interatomic bonding forces and in mechanical terms are far less stable than $SiO_2$ fibers. However, good mechanical stability is particularly relevant in particular to production of broad-band fiber amplifiers for long-term reliability. To enable them to be installed in suitable amplifier casings, it is necessary for it to be possible for fibers which have been drawn from the glasses to be rolled up to a diameter of approximately 5 to 10 cm without breaking. Furthermore, in the rolled-up state the glass fibers should also retain long-term stability.

Furthermore, heavy metal oxide glasses have a significantly lower melting point and softening point than $SiO_2$. It is therefore difficult to connect a $SiO_2$ fiber to the fiber containing heavy metal oxides for example by thermal arc welding (known as splicing). Therefore, it is desirable for there to be a minimal difference between the softening point of the heavy metal oxide glass and that of the $SiO_2$-based glass.

A rare earth-doped glass or glass product, such as a fiber or a waveguide substrate, should therefore satisfy the following key requirements simultaneously for use as a broad-band amplifier medium in the telecommunications sector:

broad and flat absorption and emission bands of rare earth ion, not just but in particular in the region of the C transmission band around 1550 nm, sufficient life span of the emitting state or of the laser level, maximum possible ability to withstand thermal loads, i.e. high softening point, high mechanical stability, good melting properties using standard melting processes, and good fiber drawing properties.

Glasses containing bismuth oxide have been described in the prior art, for example in JP 11-236245 and WO 00/23392, and have been proposed for use as optical amplifiers. In this context, in particular the function of cerium oxide is discussed; it is supposed to have a stabilizing effect on the high oxidation state of the bismuth during melting of the glass and furthermore is supposed to be advantageous in glasses with an excessively low photon energy for spectroscopic reasons. However, the addition of $CeO_2$ is disadvantageous since even small quantities of less than 0.2 mol % of $CeO_2$ cause increasing yellowish discoloration of the glass and shift the UV edge of the absorption into the region of the $Er^{3+}$ emission line at 550 nm. It has also been impossible to confirm the described positive effects on the spectroscopic properties.

WO 01/55041 A1 describes a glass containing bismuth oxide for optical fiber amplifiers which contains at least one of $Ga_2O_3$, $WO_3$ and $TeO_2$. However, these components are not advantageous. The addition of tellurium oxide may increase the risk of $Bi^{3+}$ being reduced to elemental $Bi^0$, leading to black discoloration of the glass. The addition of tungsten oxide to heavy metal oxide glasses leads to increasingly unstable glasses in terms of their susceptibility to crystallization. Gallium oxide is a relatively expensive component which is not widely commercially available, and is therefore likewise not an advantageous addition. JP 2001-213635 A likewise describes glasses which contain bismuth oxide; in this case too, almost all the glasses described contain gallium oxide. These documents do not provide a solution to the object of improving the mechanical strength and thermal stability of glasses containing bismuth oxide.

Therefore, the object of the present invention was, in view of the range of requirements stipulated above, to provide glasses containing bismuth oxide for optical amplifiers which are able to overcome the problems of the prior art and can be used to produce optical amplifiers with a broad and flat amplification characteristic. Furthermore, glasses of this type are to be sufficiently mechanically stable to enable them to be drawn to form fibers with sufficient mechanical stability.

The object is achieved by the embodiments described in the claims.

In particular the present invention relates to glass which contains bismuth oxide and has the following composition (in mol %):

| | |
|---|---|
| $Bi_2O_3$ | ≧15 |
| $GeO_2$ | ≧0.01 |
| further oxides | 0-74.99 |
| rare earth compound | 0-10 |
| | (based on oxide). |

Surprisingly, it has emerged that the glasses containing germanium oxide in accordance with the invention, compared to glasses which do not contain germanium oxide, have a wider interval between the transformation temperature $T_g$ and the crystallization temperature $T_x$. This is advantageous if the glass is to be processed further by deformation after initial cooling and solidification from the melt. The further the crystallization temperature $T_x$ is above the transformation temperature $T_g$, the lower the risk of crystallization of the glass occurring during the reheating, which would render the glass unusable. By way of example, a glass of this type is more suitable for drawing to form a glass fiber from a perform, since it is possible to maintain a sufficient distance from the crystallization temperature during the heating step which is required for the drawing operation.

Surprisingly, furthermore, the overall ability of glasses containing bismuth oxide to withstand thermal loads is also improved by the presence of germanium oxide. In this context, an improved or increased ability of a glass to withstand thermal loads is to be understood as meaning that a higher temperature is required to set a defined viscosity of a glass than for a glass with a lower or worse ability to withstand thermal loads. By way of example, the transformation temperature $T_g$ and/or the softening point EW of a glass which can withstand thermal loads are increased compared to a starting glass which does not contain any germanium oxide.

Heavy metal oxide glasses generally have a significantly worse ability to withstand thermal loads than $SiO_2$-based glasses. By way of example, they have a lower transformation temperature $T_g$ and a lower softening point EW. This may cause problems if a glass fiber produced from a glass of this type is to be connected to the standard $SiO_2$ glass fiber network as an optical amplifier fiber. This can be effected, for example, by thermal welding, known as splicing. In this process, the ends of the $SiO_2$ fibers and of the amplifier fibers are brought into spatial proximity of or contact with one another and are simultaneously heated, for example by an arc. The softened ends can then fuse together or bond to one another, so that the amplifier fiber is connected to the $SiO_2$ fiber. The further apart the viscosities of the glasses of the fibers to be connected at elevated temperature, the more difficult this fusion becomes. Even an increase in $T_g$ of a few Kelvin may therefore be advantageous for a coupling process of this nature.

Furthermore, it has been established that the introduction of the network-forming component $GeO_2$, in particular in combination with $SiO_2$, improves the mechanical properties of the glass. By way of example, what is known as the Y value is improved in the glasses according to the invention. The Y value is established by determining the Vickers hardness. For this purpose, the penetration depth in an indentation test on the surface of a glass plate is determined for a given pressure. Furthermore, it has been found that single-mode fibers which are drawn from the glasses according to the invention also have better Weibull statistics than corresponding glass fibers which do not contain any germanium oxide.

Figure 1:
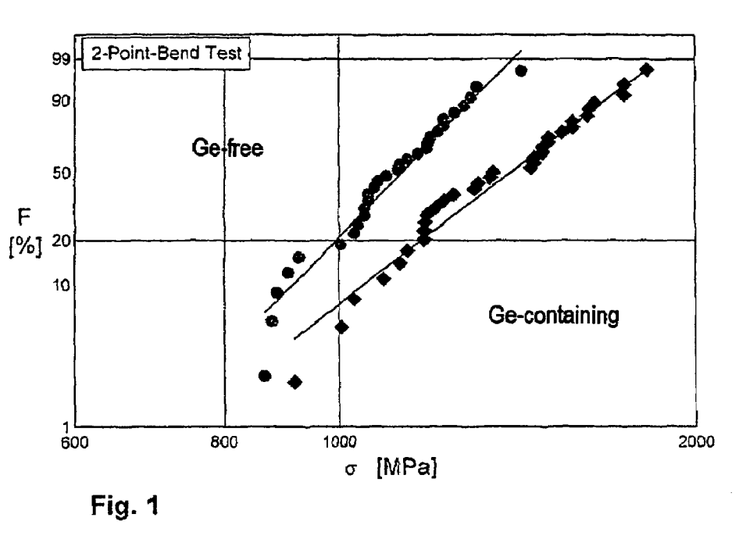
FIG. 1 compares the Weibull statistics of a glass fiber drawn from glasses according to the invention and a comparative example which is not in accordance with the invention.

FIG. 1 shows two Weibull statistics for glass fibers containing bismuth oxide. Weibull statistics of this type plot the fracture probability F against the stress σ which is applied to the fiber and corresponds to a defined bending radius of the fiber. The intention is that at the highest possible applied stress, a fiber should still have the lowest possible fracture probability. It can be seen from FIG. 1 that the $GeO_2$-containing fiber according to the invention (marked by squares) has a lower fracture probability F for the same applied stress σ than a corresponding $GeO_2$-free fiber (marked by circles). Both fibers comprise a core and a glass cladding formed around the core and have a total diameter of approximately 125 µm. They were drawn using the same drawing conditions from performs produced using the same method and have similar designs, geometries and coatings. In the fiber which was not in accordance with the invention, the germanium oxide content was substituted with the same content of gallium oxide.

Figure 6:
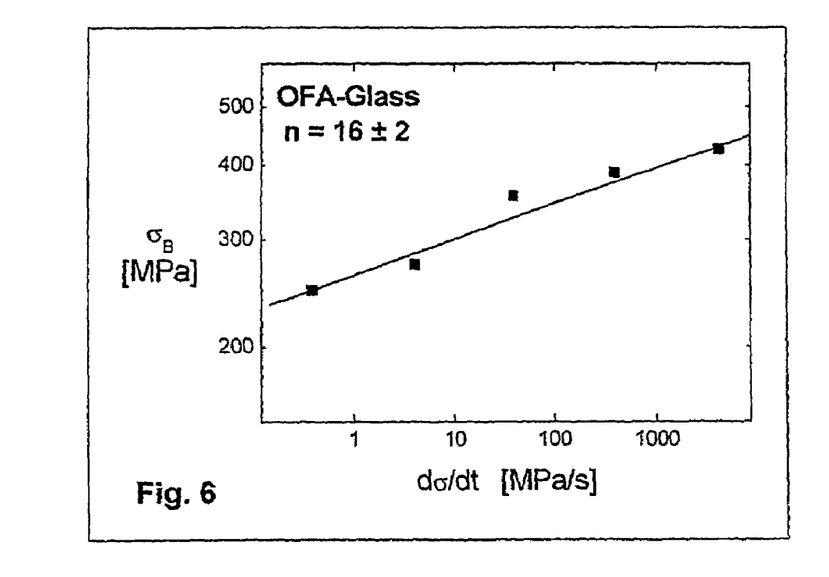
FIGS. 6 and 7 show tests carried out on the long-term stability ("reliability") of a glass fiber according to the invention.
Figure 7:
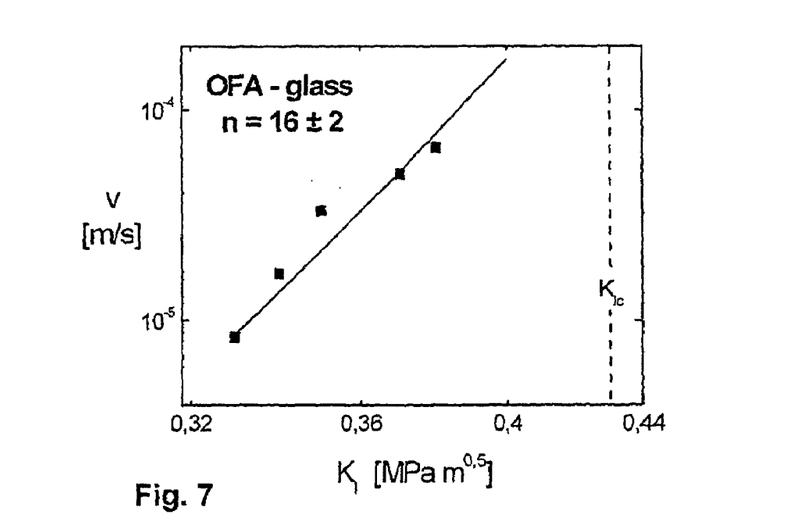

FIGS. 6 and show that the long-term stability of the fibers according to the invention is also good. FIG. 6 shows the results of what is known as a "pull-and-bend" test which was carried out on glass fibers according to the invention. FIG. 7 shows the result of a so-called "double-cleavage-drilled-compression" test (DCDC test) on a specimen of the glass composition according to the invention as described in Example 6. An n value of approx. 16 is a comparatively good value for a fiber containing heavy metal oxides and is already relatively close to the n value of silicate-based fibers of approximately 20.

In the text which follows, all the details are in mol % and based on oxide unless otherwise indicated.

The glass according to the invention contains germanium oxide in an amount of at least 0.1 mol %, preferably at least 1 mol %, particularly preferably at least 3 mol %. The glass according to the invention contains preferably at most 60 mol %, more preferably at most 50 mol %, most preferably 40 mol % of germanium oxide.

Bismuth oxide is contained in the glass according to the invention in an amount of at least 15 mol %. The bismuth oxide content in the glass is preferably at least 20 mol %. The upper limit for the bismuth oxide content in the glass is preferably 80 mol %, more preferably 70 mol %, most preferably 60 mol %. If the bismuth oxide forms more than 80 mol % of the glass, crystallization of the glass can easily occur.

In addition to the components mentioned above, the glass according to the invention may contain further oxides forming from 0 to 74.99 mol %, based on oxide.

Additional oxides of this nature may be present in order to set physico-chemical or optical properties or to reduce the susceptibility to crystallization.

To improve the fiber drawing properties, in particular if the glass according to the invention is used for an optical fiber amplifier, it is preferable to add at least one further conventional network-forming component, such as $B_2O_3$, $Al_2O_3$, etc.

Addition of $SiO_2$ has positive effects in particular on the mechanical properties of the glass but generally has adverse effects on the spectroscopic properties. The glass according to the invention preferably contains at least 1 mol %, more preferably at least 5 mol %, of $SiO_2$. Furthermore, it is preferable for the glass according to the invention to contain at most 50 mol %, more preferably at most 40 mol %, most preferably at most 30 mol %, of $SiO_2$.

The addition of $B_2O_3$ or boric acid improves the spectroscopic properties of the glass, in particular the flatness of the gain, and therefore the glass according to the invention preferably contains at least 5 mol %, more preferably at least 10 mol %, and most preferably at least 15 mol %, of $B_2O_3$. The $B_2O_3$ content is preferably at most 60 mol %, more preferably at most 40 mol %.

In particular $Al_2O_3$ may be added in order to make it easier to form the glass. The $Al_2O_3$ content is preferably at least 0.5 mol %, more preferably at least 2 mol %. The $Al_2O_3$ content is preferably at most 30 mol %, more preferably at most 20 mol %.

Furthermore, oxides of elements which are selected from the group consisting of Li, Na, K, Rb, Cs, Be, Mg, Ca, Sr, Ba, Zn, Sn, Ta, Nb, W, Ti, Zr, Cd and In may be present. These oxides preferably form at least 1 mol %. They may be present in a total amount of preferably at most 60 mol %, more preferably at most 40 mol %, in the glass composition according to the invention.

Depending on the application area the addition of lithium oxide to the glasses according to the invention is particularly preferred. It has been found that the addition of $Li_2O$ to glasses containing bismuth oxide can widen the glass-forming ranges. Furthermore, $Li_2O$ is advantageous if an amplifier with a particularly good efficiency in the L band is to be generated. It is expedient to use preferably at least 1 mol %, more preferably at least 3 mol %, of $Li_2O$.

The addition of further alkali metal oxides is particularly advantageous if the glass is to be used for planar applications, such as planar waveguides and planar optical amplifiers using the ion exchange technique.

If appropriate, the glasses according to the invention may also contain levels of halide ions, such as $F^-$ or $Cl^-$ in a weight content of at most approximately 10 mol %, particularly preferably at most approximately 5 mol %.

The glass according to the invention preferably has the following composition:

| | Preferred ranges [mol %] | Particularly preferred ranges [mol %] |
| --- | --- | --- |
| $Bi_2O_3$ | 15-70 | 20-60 |
| $GeO_2$ | 1-60 | 3-50 |
| $La_2O_3$ | 0-20 | 0-10 |
| $SiO_2$ | 0.5-60 | 1-30 |
| $B_2O_3$ | 5-60 | 10-40 |
| $Al_2O_3$ | 0.5-30 | 0.5-20 |
| $In_2O_3$ | 0-30 | 0-10 |
| $WO_3$ | 0-30 | 0-10 |
| $Nb_2O_5$ | 0-30 | 0-10 |
| $Ta_2O_5$ | 0-15 | 0-10 |
| $TiO_2$ | 0-30 | 0-10 |
| $ZrO_2$ | 0-30 | 0-10 |
| $ZnO$ | 0-30 | 0.5-10 |
| $SnO_2$ | 0-30 | 0-10 |
| $M^I_2O$ | 0-40 | 0-20 |
| $M^{II}O$ | 0-30 | 0.5-15 |
| F and/or Cl | 0-10 | 0-5 |
| $GeO_2 + SiO_2 + B_2O_3 + Al_2O_3$ | 5-85 | 30-85 |
| Rare earth compound (based on oxide) | 0-8 | 0-5 |

The addition of tungsten oxide to heavy metal oxide glasses leads to increasing susceptibility of the glasses to crystallization, i.e. makes the glasses unstable with regard to crystallization. A susceptibility toward crystallization makes further processing and/or deformation of the glass with heating, for example the drawing of fibers from a preform, more difficult. Therefore, the glass according to the invention preferably contains substantially no tungsten oxide, this expression being intended to mean that tungsten compounds are not added to the glass composition as a component, but rather are present at most as impurities in an amount of at most 0.5 mol %.

The addition of tellurium oxide to the glass according to the invention may increase the risk of $Bi^{3+}$ being reduced to form elemental $Bi^0$. Since elemental bismuth causes a black discoloration of the glass, it is disadvantageous to add tellurium compounds. Therefore, the glass according to the invention is preferably substantially free of tellurium, this expression being intended to mean that tellurium or a tellurium compound is not added to the glass composition as a component, but rather is at most present as an impurity in an amount of at most 0.5 mol %.

If the glass according to the invention is used as what is known as a passive component, for example as a cladding surrounding the optically active core of an amplifier fiber, it preferably does not contain any optically active rare earth compound. However, according to certain embodiments, it may in actual fact be preferable for passive components, such as the cladding of an amplifier fiber, also to contain small quantities of optically active rare earth compounds.

According to one embodiment of the present invention, the glasses according to the invention preferably comprise at least one rare earth compound as dopant. This embodiment relates in particular to the use of the glasses according to the invention as optically active glasses for optical amplifiers and lasers. The rare earth compound is preferably at least one oxide selected from the group consisting of oxides of Pr, Nd, Pm, Sm, Eu, Gd, Tb, Dy, Ho, Er, Tm, Yb and/or Lu. Oxides of the elements Er, Pr, Tm, Nd and/or Dy are particularly preferred, and oxides of Er are most preferred.

The glasses according to the invention may also contain cerium oxide, but this is not preferred, since cerium may produce a yellowish-orange discoloration in the glass and shifts the UV edge of the absorption into the region of the $Er^{3+}$ emission line. Therefore, the glasses according to the invention are preferably free of cerium. With the glasses described here, there is no need to add cerium oxide, since the oxidation state of the bismuth oxide can also be stabilized, if necessary, by the use of a suitable melting process.

If appropriate, it is also possible for the glass according to the invention to contain Sc compounds and/or Y compounds in addition to one or more rare earth compounds.

The rare earth compounds used as dopant are preferably what are known as "optically active compounds"; the term "optically active compounds" is to be understood as meaning, for example, compounds which lead to the glass according to the invention being capable of stimulated emission when it is excited by a suitable pumping source.

According to one embodiment, the glasses according to the invention contain at least two rare earth compounds in a total quantity of from 0.01 to 15 mol %, preferably from 0.01 to 8 mol %. Glasses with optically active rare earth ions can be co-doped with optically inactive rare earth elements in order, for example, to increase the emission lifespans. For example, Er may be co-doped with La and/or Y. To increase the pumping efficiency of the amplifier, it is also possible, for example, for Er to be co-doped with further optically active rare earth compounds, such as for example Yb. Co-doping with Gd may also be effected in order to provide stability against crystallization.

Furthermore, to make more efficient use of the excitation light, it is possible to add sensitizers, such as Yb, Ho and Nd, in a suitable quantity, for example 0.005 to 8 mol %.

The amount of each individual rare earth compound in the glass is preferably at least 0.005 mol %, more preferably at least 0.01 mol %, based on oxide. Furthermore, the amount of rare earth compound is at most 8 mol %, more preferably at most 5 mol %, based on oxide. According to one embodiment, the amount of rare earth compound(s) is from 2 to 5 mol %, based on oxide. According to a further embodiment, amount of rare earth compound(s) is from 0.01 to 2 mol %, based on oxide.

According to particularly preferred embodiment, the glasses according to the invention contain at least $Er_2O_3$ as dopant.

Figure 2:
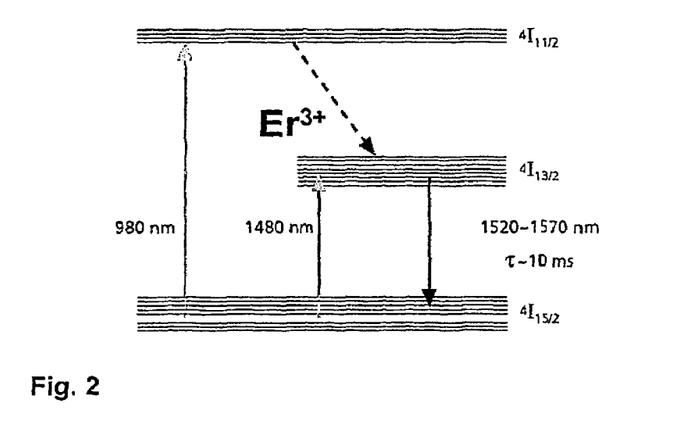
FIG. 2 shows the $Er^{3+}$ term diagram.

FIG. 2 shows the energy term diagram for $Er^{3+}$. Excited by a suitable pumping radiation, the upper laser level $^4I_{13/2}$ is populated either indirectly (980 nm via $^4I_{11/2}$) or directly (1480 nm). An incoming signal photon causes stimulated emission by excited $Er^{3+}$ ions, i.e. electrons relax, emitting photons in the signal wavelength to the unexcited state $^4I_{15/2}$. $Er^{3+}$ emits to a narrower or broader degree in the 1550 nm band depending on the degree of multiplet splitting (Stark level) of the upper and lower laser levels. This splitting is in turn dependent on the local environment of the $Er^{3+}$ in the glass matrix.

Surprisingly, it has been discovered that germanium oxide in Er-doped glasses containing bismuth oxide has a significant influence on the position of the intensity maximum of the absorption and/or emission bands of the erbium around 1550 nm and thereby has a positive influence on the flatness of the gain in the C band.

Figure 3:
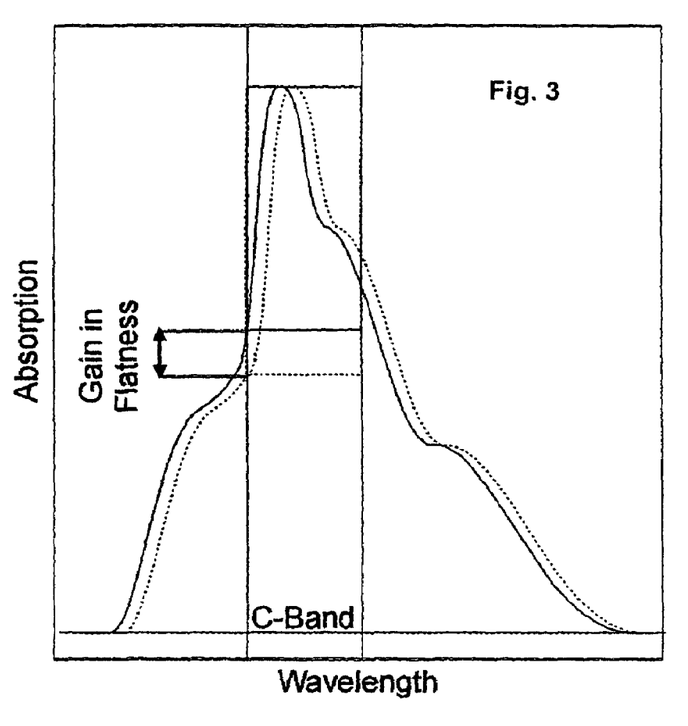
FIG. 3 diagrammatically depicts the effect of a slight shift in the absorption band toward lower wavelengths and the associated positive effect on the flatness of the gain.
Figure 4:
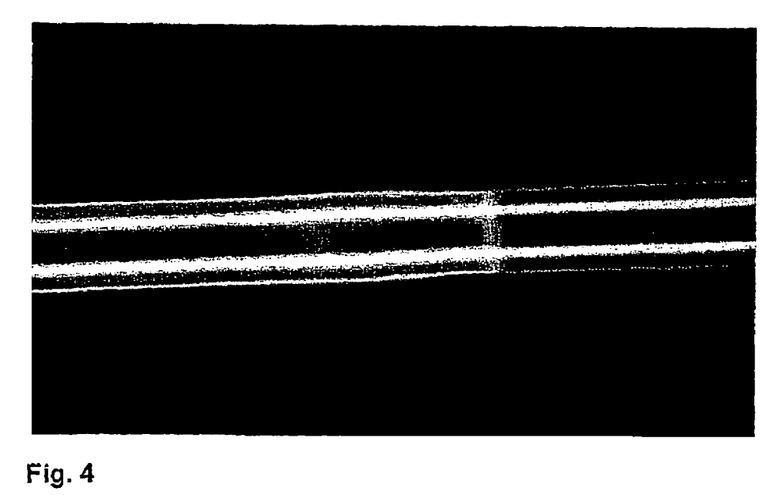
FIG. 4 shows a photograph illustrating a glass fiber according to the invention which has been connected to a silicate-based telecommunications fiber by splicing.

The germanium oxide content in the glass according to the invention shifts the flank of the absorption band in the short-wave region toward higher intensities. Since a gain spectrum results from the superimposition of absorption spectrum and emission spectrum, even only a slight shift in the maximum of the absorption band, based on a wavelength window which is of interest, e.g. the C band range between approx. 1528 and 1565 nm, results in a flatter and broader gain characteristic. FIG. 3 diagrammatically depicts a slight shift in the absorption band and the resulting positive effect on the gain.

Figure 5:
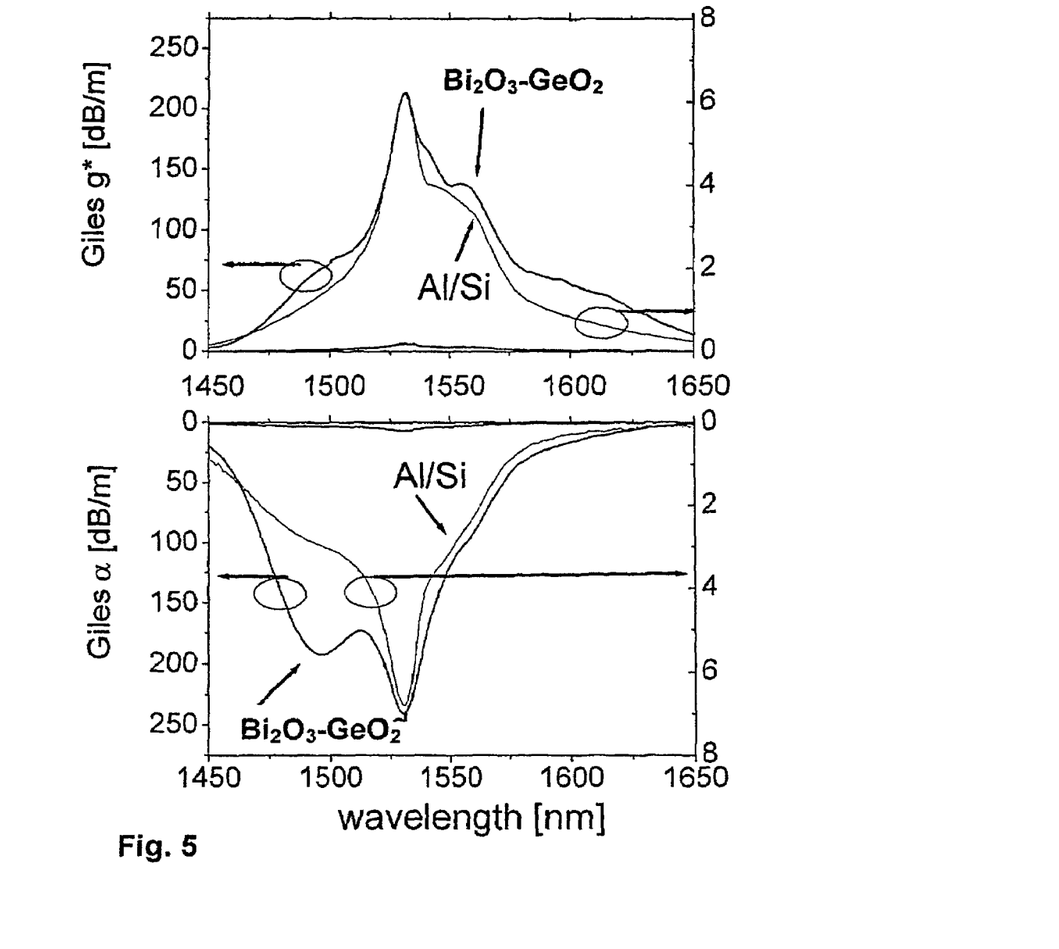
FIG. 5 shows Giles parameters for a glass fiber which has been drawn from glasses according to the invention.

FIG. 5 shows Giles parameters obtained using a glass according to the invention compared to the Giles parameters obtained using a silicate-based glass. It is clearly apparent that the band in the region around 1500 nm is significantly broadened by the glass according to the invention.

Figure 8A:
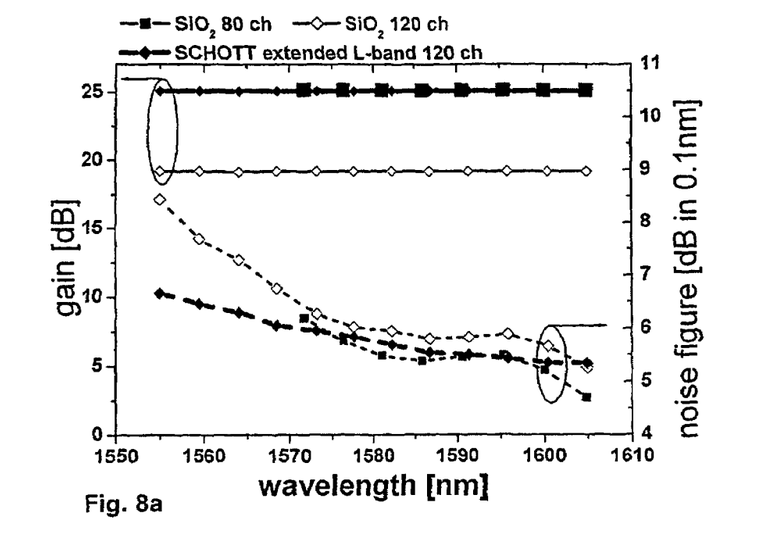
FIGS. 8a and 8b show the maximum gain, calculated from Giles parameters, for a fixed number of channels as a function of the wavelength, as well as the change in the noise as a function of the wavelength.
Figure 8B:
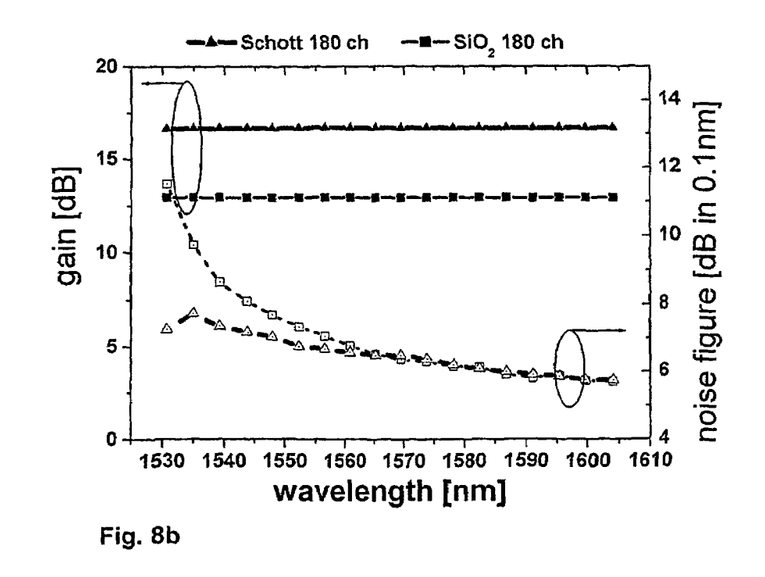

FIGS. 8a and 8b show the gain and the noise of a doped HMO double-cladding fiber in accordance with the invention compared to $SiO_2$ amplifier fibers as a function of the wavelength and the number of channels. To produce these diagrams, methods which are known from the prior art were used to determine the so-called Giles parameters for the amplifier fibers, and the maximum gain and the noise at a defined wavelength were then determined from the Giles parameters for a defined channel number. It can be seen from FIG. 8a firstly that with a set number of 120 channels [ch], a maximum gain of approx. 25 dB is achieved with an amplifier fiber according to the invention, while with the same number of channels only a maximum gain of just below 20 dD is achieve for a silicate-based amplifier fiber. To achieve a similar gain of 25 dD with a silicate-based amplifier fiber, the number of channels has to be reduced from 120 to 80 channels. At the same time, with the same number of channels the noise for the glass fiber according to the invention is significantly lower than the noise for a silicate-based fiber. The same picture emerges even with a further increase to 180 channels (FIG. 8b): the fiber according to the invention has a higher maximum gain with a lower noise. These FIGS. 8a and 8b show that broader-band transmission at low noise is possible with the HMO glass fiber according to the invention.

According to this embodiment of the present invention, it is preferable for the glass according to the invention to contain boric acid or boron oxide in an amount of in particular 5 to 60 mol %, more preferably 10 to 40 mol % (calculated as $B_2O_3$). It has emerged that boron oxide can further improve the flatness of the gain in optical amplifier glasses.

Furthermore, $SiO_2$ may preferably be present so that the lifespan τ of the upper laser level can advantageously be lengthened.

Doping with other rare earth ions makes it possible to open up other wavelength regions, such as for example what is known as the S band between 1420 and 1520 nm in the case of Tm. According to further embodiments of the present invention, therefore, other rare earth ions, such as Tm, Yb, $Pr^{3+}$, $Nd^{3+}$ and/or $Dy^{3+}$ may be preferred dopants. Tm, Pr, Nd and/or Dy dopants are particularly preferred in the glasses with relatively low photon energies, since they prevent radiationless transitions.

Surprisingly, it has been found that gallium oxide, as described below, is in many cases not advantageous in glasses containing bismuth oxide and that in particular a switch from gallium oxide to germanium oxide leads to glasses with especially good properties.

Therefore, the glass according to the invention preferably contains substantially only a small quantity of gallium oxide, such as for example at most 10 mol %, preferably at most 5 mol %, and more preferably contains substantially no gallium oxide. The expression "substantially no gallium oxide" in this context means that gallium oxide is present in the glass at most as an impurity, i.e. at most in an amount of 0.5 mol %, and no gallium compound is added to the starting batch as an additional component.

According to this first embodiment, it is particularly preferable to add aluminum oxide in an amount of from 2 to 30 mol %.

According to a further embodiment of the present invention, the glass according to the invention contains at least 15 mol % of germanium oxide, preferably at least 20 mol %. In a glass of this type, silicon oxide may be substantially completely replaced by germanium oxide. According to this embodiment, the glass according to the invention preferably contains at most 5 mol % of $SiO_2$, more preferably at most 1 mol % of $SiO_2$. The glass may also be substantially $SiO_2$-free, the expression "substantially $SiO_2$-free" meaning that $SiO_2$ is present in the glass composition at most as an impurity, i.e. in an amount of at most 0.5 mol %, and is not added to the starting batch as an additional component.

Since both silicon oxide and germanium oxide are network formers, the switch from silicon oxide to germanium oxide has no adverse effect on the mechanical stability of the glass. The increase in the transformation temperature $T_g$ and the softening point EW of the glass which is brought about by this switch, however, is, as described above, advantageous when the glass according to the invention is used in particular as a fiber amplifier.

Replacing $SiO_2$ with $GeO_2$ is also advantageous in particular if waveguides are to be scribed into the glasses by ion exchange. Therefore, the introduction of Ge instead of Si widens the glass network, making diffusion of loosely bonded particles, in particular alkali metals, easier.

According to this embodiment, the glass according to the invention may substantially consist of bismuth oxide and germanium oxide, this expression being intended to mean that the sum of the bismuth oxide and germanium oxide contents preferably amounts to at least 60 mol %, more preferably at least 80 mol %.

The present invention also relates to a process for producing the glasses according to the invention.

The glass according to the invention is preferably produced under oxidizing conditions. Oxidizing conditions of this nature may preferably be achieved by blowing oxygen into the glass melt, a process known as oxygen bubbling.

Furthermore, according to the invention it is preferable for dry oxygen to be blown in. This has the further positive effect of also promoting the dewatering of the melt to a considerable extent. Furthermore, to dry the glass composition or melt, it is preferable for the batch of starting materials to be subjected to a preliminary heat treatment, for example by drying the batch, preferably in vacuo. The addition of halogenated oxygen also promotes the dewatering, and consequently according to certain embodiments of the present invention it is also preferable to blow in halogenated oxygen. The above measures for drying the batch or melt can be employed individually or in combination with one another.

A further possibility for establishing oxidizing conditions during the glass making process is the addition of oxides of polyvalent (pentavalent) cations, e.g. Sb as $NaSb(OH)_6$, $Nb_2O_5$, $SnO_2$, $Cr_2O_3$, $V_2O_5$, $As_2O_3$ and/or mixtures thereof to the glass composition. Since, for example, antimony has a higher electronegativity than bismuth, antimony will always oxidize any reduced bismuth. On the other hand, antimony is not reduced to the elemental metal, and consequently the glass cannot be subjected to black deposition resulting from the precipitation of elemental metal. According to this embodiment, it is preferable for approximately 0.01 to 10% by weight, more preferably up to 5% by weight (based on oxide) of a pentavalent compound to be added to the glass composition.

The present invention also relates to the use of a glass according to the invention for optical amplifiers, which may be fiber amplifiers or planar amplifiers. In these amplifiers, the glass according to the invention can be used as matrix or core glass and/or as cladding glass. In glass fibers of this nature, it is preferable for a composition which is similar apart from the doping to be used as cladding glass.

Furthermore, the glass according to the invention can be used as matrix glass, i.e. the optically active component, and/or the passive component of a laser.

Furthermore, the glasses according to the invention can be used as what are known as up-conversion glasses.

Furthermore, the glasses according to the invention can be used as what are known as nonlinear-optical glasses.

The present invention also relates to a glass fiber which contains the glass according to the invention, and to optical amplifiers which include a glass fiber according to the invention or contain the glass according to the invention.

A glass fiber for an optical fiber amplifier in this case comprises a core which is doped with an optically active rare earth ion and at least one cladding. It is preferable for core and/or cladding or claddings of this glass fiber to comprise a glass according to the invention. More preferably, both the core and at least part of the cladding region comprise the glass composition according to the invention. Furthermore, the cladding glass used preferably has a very similar composition to the core glass. It is preferable for the cladding which surrounds the core not to have an optically active rare earth doping and/or to have a lower refractive index than the core. One or more further glass claddings likewise preferably comprise the glass according to the invention and/or preferably contain absorbent agents, such as transition metal oxides, for example oxides of Fe, Co and/or Ni, with cobalt being particularly preferred.

Optically active cores of glass fibers for fiber amplifiers generally have to be sheathed with glass cladding with a lower refractive index than that of the core glass, in order to ensure sufficient light conduction in the core. The glass of the cladding should otherwise have the same physical properties as and a similar chemical composition to the core glass in order to allow simultaneous drawing of core glass and cladding glass to form a fiber. Unlike the optically active core, the cladding does not generally contain a rare earth doping.

To set a defined change in refractive index for example between core and cladding, it is advantageous to exchange the maximum possible quantity of a component with a high refractive index for a component with a low refractive index. Then, any weighing errors in the initial batch have only a minor influence on the change in refractive index. To set the refractive index of the cladding glass, a proportion of the bismuth oxide of the glass composition of the core glass is generally exchanged for silicon dioxide. However, since the very low refractive index of silicon oxide compared to the very high refractive index of bismuth oxide means that even very low levels of substitution are sufficient to set the desired change in refractive index, even minor weighing errors have a considerable effect on the change in refractive index between cladding and core. However, this change in refractive index is critical to the numerical aperture, which is calculated from the refractive index of core and cladding and is used to determine the angle at which a lightwave is reflected at the interface between core glass and cladding glass.

In this context, replacement of bismuth oxide with germanium oxide has proven highly advantageous compared to replacement with $SiO_2$ in the same molar amount, since germanium oxide reduces the refractive index of the glass to a much lesser extent for the same level of replacement. Therefore, in relative terms greater quantities of germanium oxide are required in order to set the same change in refractive index. This is advantageous for the reasons specified above.

Replacing $Bi_2O_3$ with $GeO_2$ also has advantageous effects on the process used to produce a sheathed fiber or a preform for producing a sheathed fiber. During production of a sheathed fiber or preform of a sheathed fiber by means of a double crucible process, the core composition is melted in an inner crucible and the cladding composition is melted in an outer crucible surrounding this inner crucible. The presence of a germanium oxide-rich cladding melt has the advantage that the glass melt which is present in the outer crucible, on account of the higher softening point of a cladding with a higher germanium oxide content, is slightly more viscous at the same temperature than the melt contained in the inner crucible. In such a case, the inner crucible can be heated via the outer crucible yet the glass in the inner crucible is nevertheless melted sufficiently well. This is advantageous in particular in the case of glasses with a steep viscosity against temperature curve.

EXAMPLES

All glass compositions of the Examples and Comparative Examples were melted from pure raw materials, which had not yet been optimized with regard to trace impurities, in Pt crucibles. After approximately 1.5 h, the liquid glass was poured into preheated graphite molds and cooled from $T_g$ to room temperature in the cooling furnace at cooling rates of up to 15 K/h.

Table 1 summarizes the compositions of the glasses of the Examples and Comparative Examples, as well as the properties of the glasses obtained.

TABLE 1

|  | Ex. 1 17251 | Comp. Ex. 1 17265 | Ex. 2 17381 | Ex. 3 17380 | Ex. 4 17414 | Ex. 5 17624 |
|---|---|---|---|---|---|---|
| $Bi_2O_3$ [mol %] | 35.10 | 35.10 | 49.90 | 34.90 | 43.97 | 42.60 |
| $B_2O_3$ [mol %] | 35.00 | 35.00 | 14.80 | 15.00 | 19.98 | 28.50 |
| $SiO_2$ [mol %] | 9.70 | 9.70 | 19.10 | 25.90 | 12.70 | 14.30 |
| $GeO_2$ [mol %] | 15.13 | — | 8.12 | 8.13 | 5.10 | 3.60 |
| $Al_2O_3$ [mol %] | 5.00 | 9.90 | 8.00 | 8.00 | 5.00 | 10.60 |
| $Ga_2O_3$ [mol %] | — | 10.23 | — | — | 10.10 | — |
| ZnO [mol %] | — | — | — | — | — | — |
| $Li_2O$ [mol %] | — | — | — | 8.00 | 3.08 | — |
| $Er_2O_3$ [mol %] | 0.07 | 0.07 | 0.08 | 0.07 | 0.07 | 0.40 |
| $T_q$ [° C.] | 451 | 466 | 409 | 415 | 412 | 433 |
| $T_q - T_x$ [K] | 153 | 115 | 162 | 123 | 180 | 183 |
| EW [° C.] | 496 | 447 | 460 | 474 | 466 | 486 |
| Density | 6.0793 | 5.9756 | 6.9780 | 6.0691 | 6.7198 | 6.4262 |
| $n_{1300}$ | 1.9385 | 1.9269 | 2.0590 | 1.9404 | 2.0243 | 1.9839 |
| τ (37%) | 1.13 | 1.02 | 1.94 | 2.01 | 1.70 | 1.11 |
| $Peak_{Absorption}$ [nm] |  |  |  |  |  | 1530.2 |
| $Peak_{Emission}$ [nm] |  |  |  |  |  | 1531.1 |
| $Inversion_{C\ band}$[1)2)] | 0.557 | 0.574 | 0.601 | 0.592 | 0.608 | 0.579 |
| $Flatness_{C\ band}$[1)3)] | 0.200 | 0.230 | 0.430 | 0.470 | 0.370 | 0.248 |
| $Inversion_{Ext.\ C\ band}$[4)2)] | 0.517 | 0.524 | 0.549 | 0.536 | 0.556 | 0.526 |
| $Flatness_{Ext.\ C\ band}$[4)3)] | 0.330 | 0.340 | 0.560 | 0.620 | 0.490 | 0.360 |
| $Integral_{Abs.\ cross}$[5)] | 552 | 538 | 545 | 516 | 547 |  |
| $Integral_{Emis.\ cross}$[5)] | 671 | 631 | 583 | 575 | 599 |  |
| Emis. cross FWHM[6)] | 38 | 37 | 30 | 30 | 31 |  |
| Abs. Cross FWHM[6)] | 76 | 75 | 71 | 71 | 72 |  |
| Y value | 74 | 71 | 75 | 112 | 90 |  |

|  | Comp. Ex. 5 17618 | Ex. 6 17880 | Ex. 7 20122 | Exp. 8 20180 | Exp. 9 19018 | Exp. 10 20191 |
|---|---|---|---|---|---|---|
| $Bi_2O_3$ [mol %] | 42.60 | 42.60 | 42.64 | 42.64 | 42.64 | 40.64 |
| $B_2O_3$ [mol %] | 28.50 | 28.49 | 5.49 | 5.49 | 5.49 | 30.49 |
| $SiO_2$ [mol %] | 14.30 | 14.28 | 37.32 | 42.87 | 32.28 | 10.28 |
| $GeO_2$ [mol %] | — | 3.6 | 3.6 | 3.6 | 3.6 | 7.6 |
| $Al_2O_3$ [mol %] | 10.60 | 10.59 | 10.59 | 5.00 | 10.59 | 10.59 |
| $Ga_2O_3$ [mol %] | 3.60 | — | — | — | — | — |
| ZnO [mol %] | — | — | — | — | 5.00 | — |
| $Li_2O$ [mol %] | — | — | — | — | — | — |
| $Er_2O_3$ [mol %] | 0.40 | 0.40 | 0.40 | 0.40 | 0.40 | 0.40 |
| $T_q$ [° C.] | 437 | 433 | 450 | 447 | 454 | 440 |
| $T_q - T_x$ [K] | 119 |  | 143 | 129 | 153 | 122 |
| EW [° C.] | 481 | 482 |  |  |  | 485 |
| Density | 6.4218 | 6.4186 | 6.5055 | 6.5973 | 6.6307 | 6.3384 |
| $n_{1300}$ | 1.9832 | 1.9832 | 1.9847 | 1.9948 | 2.0048 | 1.9728 |
| τ (37%) | 1.11 | 1.01 | 2.3 | 2.3 | 2.2 | 0.92 |
| $Peak_{Absorption}$ [nm] | 1530.4 |  |  |  |  |  |
| $Peak_{Emission}$ [nm] | 1531.2 |  |  |  |  |  |
| $Inversion_{C\ band}$[1)2)] | 0.574 | 0.583 | 0.567 | 0.564 | 0.573 | 0.552 |
| $Flatness_{C\ band}$[1)3)] | 0.255 | 0.226 | 0.361 | 0.421 | 0.406 | 0.172 |
| $Inversion_{Ext.\ C\ band}$[4)2)] | 0.524 | 0.535 | 0.520 | 0.509 | 0.518 | 0.530 |
| $Flatness_{Ext.\ C\ band}$[4)3)] | 0.360 | 0.350 | 0.444 | 0.550 | 0.497 | 0.333 |
| $Integral_{Abs.\ cross}$[5)] |  | 529 | 513 | 518 | 511 | 558 |
| $Integral_{Emis.\ cross}$[5)] |  |  |  |  |  |  |
| Emis. cross FWHM[6)] |  | 36 | 30 | 29 | 28 | 36 |
| Abs. Cross FWHM[6)] |  | 74 | 70 | 70 | 70 | 73 |
| Y value |  | 106 |  |  |  |  |

Comments in connection tith Table 1:
[1)]C band: 1530 to 1562 nm
[2)]inversion: characteristic value for inversion in band, should be as high as possible
[3)]flatness: characteristic value for flatness of the gain in a band, should be as low as possible
[4)]Ext.C band: extended C band, from 1528 to 1570 nm
[5)]integral absorption or emission cross section, should be as great as possible
[6)]absorption or emission cross section FWHM (full width at half maximum), should be as great as possible.

Compared to the glasses of the Comparative Examples, all the glasses according to the invention have a considerable interval between the transformation temperature $T_g$ and crystallization temperature $T_x$. The further the crystallization temperature $T_x$ is above $T_g$, the more suitable the glass is for drawing to form a glass fiber, since the crystallization temperature is not reached during the heating step required for the drawing operation.

The glasses according to the invention of the Examples have, for heavy metal oxide glasses, very good Y values of at least 74, which corresponds approximately to the strength of window glass. By way of example Y values of only 57 to 63 are achieved for glasses containing tellurium oxide.

The lifespans τ of the upper laser level, compared with those of silicate-based glasses, are relatively short. Nevertheless they are sufficient to produce an efficient amplifier using a suitable amplifier design.

Example 1 and Comparative Example 1 have a relatively high $B_2O_3$ content. The spectroscopic properties, in particular the flatness in the C band and the absorption and emission cross sections of these glasses tend to be relatively good. As can be seen from a comparison of Example 1 with Comparative Example 1, the $GeO_2$-containing glass according to the invention in addition has a softening point EW which is higher by approximately 50° C., an improved Y value and a greater interval between the transformation temperature and the crystallization temperature. Furthermore, an increase in the lifespan of the upper laser level $I^{13/2}$ of $Er^{3+}$ is achieved, and the other spectroscopic properties of the glass are also slightly improved.

The glass from Example 3 contains a relatively large quantity of $SiO_2$. For this reason, the mechanical properties of this glass are relatively good. The in relative terms longer lifespan is also produced by the high $SiO_2$ content. At the same time, however, the spectroscopic properties, in particular the flatness of the gain in the C band, are slightly worse than those of the other glasses according to the invention. The difference between $T_g$ and $T_x$ is also less.

It can be seen from a comparison of Example 5 according to the invention and Comparative Example 5 that replacing even small amounts, just 3.5 mol %, of $Ga_2O_3$ with $GeO_2$ causes a slight but nevertheless influential shift in the emission maximum toward shorter wavelengths, reflected in an improved flatness of the gain, from 0.255 to 0.248. The clear rise in the difference between $T_g$ and $T_x$, in Example 1 according to the invention is noticeable.

A double-clad fiber was produced using the glass composition from Example 5 as core glass and as cladding glasses adjusted as required for the change in refractive index (cf. Table 2). First of all, a double crucible was used to produce a preform comprising core and first cladding. Then, this preform was provided with the second cladding by means of the rod-in-tube process. Then, the preform obtained was drawn to form a glass fiber with a diameter of 125 μm. Then, the fiber was sheathed with an acrylic polymer coating to provide mechanical protection.

TABLE 2

|  | Core | Cladding 1 | Cladding 2 |
| --- | --- | --- | --- |
| $Bi_2O_3$ [mol %] | 42.6 | 41.0 | 42.0 |
| $B_2O_3$ [mol %] | 28.5 | 26.5 | 26.5 |
| $SiO_2$ [mol %] | 14.3 | 18.3 | 17.1 |
| $GeO_2$ [mol %] | 3.6 | 3.6 | 3.6 |
| $Al_2O_3$ [mol %] | 10.6 | 10.6 | 10.6 |
| $Er_2O_3$ [mol %] | 0.4 | — | — |
| CoO [mol %] | — | — | 0.2 |
| $n_{1300}$[1] | 1.982 | 1.964 | 1.978 |

The invention claimed is:

1. A process for producing a bismuth-containing glass, in which a glass melt is formed under oxidizing conditions and said glass melt has a composition in mol % comprising:

| | |
| --- | --- |
| $Bi_2O_3$ | 20-60 |
| $GeO_2$ | 3-40 |
| $La_2O_3$ | 0-20 |
| $SiO_2$ | 1-19.10 |
| $Ga_2O_3$ | 0-10.10 |
| $B_2O_3$ | 15-40 |
| $Al_2O_3$ | 0.5-30 |
| $WO_3$ | 0-30 |
| $Nb_2O_5$ | 0-30 |
| $Ta_2O_5$ | 0-15 |
| $TiO_2$ | 0-30 |
| $ZrO_2$ | 0-30 |
| $SnO_2$ | 0-30 |
| $Li_2O$ | at least 1 |
| $M^I_2O$ | 0-40 |
| $M^{II}O$ | 0-30 |
| F and/or Cl | 0-10 |
| $Bi_2O_3 + GeO_2 + B_2O_3 + Al_2O_3$ | 5-85, | where $M^I$ is at least one of Li, Na, K, Rb and Cs and $M^{II}$ is at least one of Be, Mg, Ca, Sr and Ba; and which is substantially free of tellurium.

2. The process as claimed in claim 1, in which the oxidizing conditions are produced by blowing oxygen into the glass melt.

3. The process as claimed in claim 1, in which a polyvalent compound, which is selected from the group consisting of $Nb_2O_5$, $Sb_2O_5$, $SnO_2$, $Cr_2O_3$, $As_2O_3$ and $V_2O_5$, or a mixture thereof, is added to a mixture to be melted to form the glass melt.

4. A glass fiber, comprising a core and at least one cladding surrounding the core, wherein said core comprises a core glass, said at least one cladding comprises at least one cladding glass, and said core glass and/or said at least one cladding glass each have a respective composition in mol % comprising:

| | |
| --- | --- |
| $Bi_2O_3$ | 20-60 |
| $GeO_2$ | 3-40 |
| $La_2O_3$ | 0-20 |
| $SiO_2$ | 1-19.10 |
| $Ga_2O_3$ | 0-10.10 |
| $B_2O_3$ | 15-40 |
| $Al_2O_3$ | 0.5-30 |
| $WO_3$ | 0-30 |
| $Nb_2O_5$ | 0-30 |
| $Ta_2O_5$ | 0-15 |
| $TiO_2$ | 0-30 |
| $ZrO_2$ | 0-30 |
| $SnO_2$ | 0-30 |
| $Li_2O$ | at least 1 |
| $M^I_2O$ | 0-40 |
| $M^{II}O$ | 0-30 |
| F and/or Cl | 0-10 |
| $Bi_2O_3 + GeO_2 + B_2O_3 + Al_2O_3$ | 5-85, | where $M^I$ is at least one of Li, Na, K, Rb and Cs and $M^{II}$ is at least one of Be, Mg, Ca, Sr and Ba and which is substantially free of tellurium.

5. The glass fiber as claimed in claim 4, wherein said core glass is optically active.

6. The glass fiber as claimed in claim 5, further comprising at least one further cladding, and wherein said at least one further cladding comprises a plastic.

7. A bismuth-containing glass with a composition in mol % comprising:

| | |
| --- | --- |
| $Bi_2O_3$ | 20-60 |
| $GeO_2$ | 3-40 |
| $La_2O_3$ | 0-20 |
| $SiO_2$ | 1-19.10 |
| $Ga_2O_3$ | 0-10.10 |

-continued

| | |
|---|---|
| $B_2O_3$ | 15-40 |
| $Al_2O_3$ | 0.5-30 |
| $WO_3$ | 0-30 |
| $Nb_2O_5$ | 0-30 |
| $Ta_2O_5$ | 0-15 |
| $TiO_2$ | 0-30 |
| $ZrO_2$ | 0-30 |
| $SnO_2$ | 0-30 |
| $Li_2O$ | at least 1 |
| $M^I_2O$ | 0-40 |
| $M^{II}O$ | 0-30 |
| F and/or Cl | 0-10 |
| $Bi_2O_3 + GeO_2 + B_2O_3 + Al_2O_3$ | 5-85, | where $M^I$ is at least one of Li, Na, K, Rb and Cs and $M^{II}$ is at least one of Be, Mg, Ca, Sr and Ba; and which is substantially free of tellurium.

8. The glass as defined in claim 7, and containing at least 3 mol % of said $Li_2O$.

* * * * *